United States Patent
Yamaguchi et al.

(10) Patent No.: US 7,699,409 B2
(45) Date of Patent: Apr. 20, 2010

(54) VEHICLE BRAKE FLUID PRESSURE CONTROL DEVICE

(75) Inventors: Masanobu Yamaguchi, Kariya (JP); Tomohiro Kato, Kariya (JP); Chiaki Hamada, Mishima (JP)

(73) Assignees: Advics Co., Ltd., Aichi-pref. (JP); Toyota Jidosha Kabushiki Kaisha, Aichi-ken (JP)

( * ) Notice: Subject to any disclaimer, the term of this patent is extended or adjusted under 35 U.S.C. 154(b) by 1063 days.

(21) Appl. No.: 11/386,716

(22) Filed: Mar. 23, 2006

(65) Prior Publication Data

US 2006/0214505 A1 Sep. 28, 2006

(30) Foreign Application Priority Data

Mar. 25, 2005 (JP) .............................. 2005-088617

(51) Int. Cl.
  *B60T 8/66* (2006.01)
(52) U.S. Cl. .................................... 303/119.1; 303/162
(58) Field of Classification Search ...................... 303/3,
  303/15, 20, 113.2–113.4, 119.2, 155, 166,
  303/119.1, 162
  See application file for complete search history.

(56) References Cited

U.S. PATENT DOCUMENTS

| | | | | |
|---|---|---|---|---|
| 3,948,569 A | * | 4/1976 | Gentet et al. .................. | 303/159 |
| 6,086,167 A | * | 7/2000 | Heckmann et al. ........... | 303/155 |
| 2002/0096939 A1 | * | 7/2002 | Sakata et al. .............. | 303/119.1 |
| 2003/0098613 A1 | * | 5/2003 | Bohm et al. ................. | 303/166 |
| 2003/0214183 A1 | * | 11/2003 | Breitenbacher et al. ..... | 303/162 |
| 2004/0012258 A1 | * | 1/2004 | Hosoi et al. .............. | 303/119.2 |
| 2004/0026990 A1 | * | 2/2004 | Haeussler et al. ......... | 303/113.1 |
| 2004/0080208 A1 | * | 4/2004 | Giers et al. .................... | 303/20 |
| 2005/0001481 A1 | * | 1/2005 | Kley et al. .................. | 303/191 |
| 2007/0030618 A1 | | 2/2007 | Heinz et al. | |
| 2007/0158607 A1 | | 7/2007 | Fey et al. | |

FOREIGN PATENT DOCUMENTS

| | | |
|---|---|---|
| DE | 102 16 485 | 3/2003 |
| JP | A-H01-116271 | 5/1989 |
| JP | A-H01-310166 | 12/1989 |
| JP | A-H11-147466 | 6/1999 |
| JP | A-2003-19952 | 1/2003 |
| JP | A-2005-035470 | 2/2005 |

OTHER PUBLICATIONS

Office Action mailed Aug. 25, 2009 from the Japan Patent Office in corresponding Japanese Patent Application No. 2005-088617 (and English translation).

* cited by examiner

*Primary Examiner*—Christopher P Schwartz
(74) *Attorney, Agent, or Firm*—Posz Law Group, PLC

(57) ABSTRACT

The similarity groups of the pressure differential—current characteristics of solenoid valves are measured in advance, and the measurement results are used to select the solenoid valves to be used for first to fourth pressure increase control valves. Only solenoid valves in the same region in terms of their similarity group of the pressure differential—current characteristics are used for the first to fourth pressure increase control valves. A board on which the first to fourth control valves are mounted is provided with a mark unit that indicates the similarity group of the pressure differential—current characteristics of the first to forth pressure increase control valves. The mark unit includes a resistor. A brake ECU uses the resistance value of the resistor to identify the similarity group of the pressure differential—current characteristics of the first to fourth pressure increase control valves.

9 Claims, 4 Drawing Sheets

VEHICLE BRAKE FLUID PRESSURE CONTROL DEVICE

CROSS REFERENCE TO RELATED APPLICATION

This application is based upon and claims the benefit of Japanese Patent Application No. 2005-88617 filed on Mar. 25, 2005, the content of which are incorporated herein by reference.

FIELD OF THE INVENTION

The present invention relates to a brake fluid pressure control device including solenoid valves that control opening and closing of brake conduits in a brake hydraulic circuit.

BACKGROUND OF THE INVENTION

Known vehicle brake fluid pressure control devices that perform ABS control include pressure increase control valves disposed in brake conduits that connect a master cylinder (hereinafter "M/C") to wheel cylinders (hereinafter "W/C") provided in each wheel. The pressure increase control valves control the flow of brake fluid to each W/C, and are normally open solenoid valves that can be controlled to two-positions, namely, an open position and a closed position.

When a pressure increase mode is set during ABS control of a vehicle brake fluid pressure control device like that described above, the pressure increase control valve is opened for determined periods to apply the M/C pressure to the W/Cs. However, because the pressure increase control valve is rapidly switched between open and closed positions, namely, because pulsed pressure increase is performed as is standard in known technology, a pulsing sound (operating noise) is generated every time switching takes place. To address this problem, technologies have been proposed (for example, in Japanese Patent Application Publication No. JP-A-2003-19952) in which the pressure increase control valves are controlled like a linear valve by adjusting the control current (the amount of current) to the pressure increase control valves (this control will be referred to hereinafter as "linear operation" or "operated linearly" depending on the context). Use of this configuration allows the pulsing sound that occurs in the pressure increase mode to be reduced.

More specifically, in each pressure increase control valve, the pressure differential between the upstream and downstream sides is changed in accordance with the size of the gap between the valve element and the valve seat inside the valve. Accordingly, if the magnitude of the control current is changed to adjust the size of the gap, namely, to adjust the pressure differential between the upstream and downstream sides of the pressure increase control valve, linear operation of the pressure increase control valve can be achieved. Thus, the pressure increase control valve does not rapidly switch between open and closed positions, whereby pulsing noise is reduced (as in the example of Japanese Patent Application Publication No. JP-A-2003-19952).

If the W/C pressure is smoothly adjusted by performing linear operation of the pressure increase control valve as in the art described above, the relationship of the control current applied to the pressure increase control valves and the pressure differential is extremely important. However, this relationship is liable to change if there is variation in the characteristics of the pressure increase control valves caused by manufacturing error. In this case, the adjustment accuracy of the W/C pressure falls.

To address this difficulty, a known art (refer to Japanese Patent Application Publication No. JP-A-H11-147466) proposes a configuration for brake fluid pressure control in which a brake ECU directly measures the characteristics of linear valves (solenoid valves). The characteristics are then stored in the brake ECU, and operation performed in accordance with the characteristics of the linear valves (solenoid valves). Accordingly, a fall in adjustment accuracy due to variation in the characteristics of the linear valves (solenoid valves) is inhibited.

However, if the characteristics of the solenoid valves are directly measured in this way, a device for measuring the characteristics must be provided in the brake ECU, which makes the vehicle brake fluid pressure control device more complicated and more expensive. In order to avoid these problems, the characteristic measuring device could be omitted by (i) trying to reduce the variation in the characteristics of the solenoid valves caused by manufacturing error, or (ii) measuring the characteristics of the solenoid valves first and then only selecting good solenoid valves for use in the vehicle brake fluid pressure control device. However, if the former approach were used, the manufacturing costs of the solenoid valves would be increased by the need for more rigorous management of the design and processing of the solenoid valves. On the other hand, if the latter approach were used, the manufacturing yield would reduce because the un-suitable solenoid valves that were not selected would have to be done away with.

SUMMARY OF THE INVENTION

It is an object of the present invention to inhibit adjustment accuracy of a brake fluid pressure control from falling even when a brake fluid pressure control device uses solenoid valves that have variation in their characteristics.

In order to achieve this object, the inventors carried out the following investigation. First, a map showing the pressure differential—current characteristics of solenoid valves was created. Then, the distribution of the characteristics variation of the solenoid valves was investigated using the map, and the example distribution of the valves within region X shown in FIG. 4 was identified.

In the case that the variation in the characteristics of the solenoid valves is like that shown in this figure, deviation from a target pressure differential occurs depending on the value of the control current applied to the solenoid valves. At this time, if the required accuracy of the solenoid valves is, for example, within a determined range centering on the target pressure differential, then only some of the solenoid valves in the distribution of region X will satisfy the required accuracy. Naturally, not all of the solenoid valves will satisfy the required accuracy.

However, region X may be divided up into, for example, three regions A to C with ranges that correspond to the required accuracy, or ranges that are smaller than the required accuracy. Then, the relationship of target pressure differential with respect to the value of the control current may be independently set for each region, and solenoid valves that satisfy the required accuracy for each region identified.

More specifically, in the case of the solenoid valves in region A, if the value of the control current is set to a value that corresponds with region A, the pressure differential generated when the control current is applied to the solenoid valves will be within the range of required accuracy from the target pressure differential. Further, in the case of solenoid valves in regions B and C as well, the value of the control current may similarly be set to respective values that correspond with region B or region C. When the respective control currents are applied to the solenoid valves, the generated pressure differentials will be within the range of required accuracy from the respective target pressure differentials.

Given the above facts, when the solenoid valves are manufactured, the characteristics of the solenoid valves can be measured and solenoid valves selected that are within one of regions A, B or C. Then, when the solenoid valves are mounted to a board, a mark unit can be pre-provided on the board that generates a mark that indicates the characteristics of the selected solenoid valves. A brake ECU can then read this mark to identify the characteristic of the solenoid valves, without requiring the characteristics of each and every solenoid valve to be stored in the brake ECU.

More specifically, there are occasions when a plurality of solenoid valves used in a vehicle brake fluid pressure control device are mounted on a single board. In this case, if only solenoid valves in the same region among regions A to C are mounted on the same board, the characteristics of the solenoid valves mounted on the board will be the same. Thus, the characteristics of the solenoid valves mounted to the board can be indicated using just a single mark.

Moreover, a characteristics map showing the central values in each of the regions A to C may be pre-stored in the brake ECU. The brake ECU can then identify which one of the regions A to C is indicated by the mark provided on the board. The brake ECU then causes a current, which has the same value as the central value of the identified region, to be applied to the solenoid valves as a control current. If the above described configuration is used, the solenoid valves always generate a pressure differential that satisfies the required accuracy, which makes it possible to inhibit the accuracy of pressure adjustment in the brake fluid pressure control from falling.

Based on the above analysis, a vehicle brake fluid pressure control device according to a first aspect of the invention includes a solenoid valve, a control unit, and a mark unit. The solenoid valve generates a pressure differential between its upstream and downstream sides in accordance with the magnitude of a control current. The control unit controls the magnitude of the control current applied to the solenoid valves to generate a target pressure differential between the upstream and downstream sides of the solenoid valve. The mark unit indicates a similarity group of the pressure differential—current characteristics of the solenoid valve. The control unit stores a map in which the entire range of variation in pressure differential—current characteristics of the solenoid valve is divided into a plurality of regions respectively defined as the similarity group of the pressure differential—current characteristics. The control unit identifies the similarity group of the pressure differential—current characteristics of the solenoid valve indicated by the mark unit to identify which of the plurality of regions the solenoid valve is within. When brake fluid pressure control is performed, the control unit sets the magnitude of the control current to a value that accords with the identified region.

In this configuration, the mark unit is provided that indicates the similarity group of the pressure differential—current characteristics of the solenoid valve. Thus, the control unit can use the mark unit to identify the similarity group of the pressure differential—current characteristics of the solenoid valve. After the control unit has identified the similarity group of the pressure differential—current characteristics of the solenoid valve, the control unit sets the control current in accordance with the identified similarity group of the pressure differential—current characteristics, whereby the solenoid valve generates a pressure differential that satisfies the required accuracy. Therefore, the adjustment accuracy of the brake fluid pressure control can be inhibited from falling without providing a characteristics measurement device to individually measure the characteristics of the solenoid valve in the control unit.

According to a second aspect of the invention, the solenoid valve is provided in a plurality. The solenoid valves are mounted on a single board and are electrically connected to wiring provided on the board. The solenoid valves mounted on the board comprise only solenoid valves that are in the same region among the plurality of regions. Further, the mark unit comprises a single mark that indicates the similarity group of the pressure differential—current characteristics of the plurality of solenoid valves.

Note that, only solenoid valves in the same region are used in the above configuration. These solenoid valves are selected from among various solenoid valves based on measurement results obtained from pre-measuring the similarity group of the pressure differential—current characteristics of the solenoid valves in advance. As a result of adopting this configuration, only a single mark unit need be provided. Thus, the structure required to identify the similarity group of the pressure differential—current characteristics of the solenoid valves can be simplified.

In addition, according to a third aspect of the invention, the mark unit uses a resistance value to indicate the similarity group of the pressure differential—current characteristics of the solenoid valves. Further, the resistance value of the mark unit may be set to be different for each of the plurality of regions. In addition, according to a fourth aspect of the invention, the control unit identifies the similarity group of the pressure differential—current characteristics of the solenoid valve by reading the electric potential of a determining portion that changes in accordance with the resistance value of the mark unit.

According to a fifth aspect of the invention, the resistance value that indicates a central region that is at the center of the plurality of regions is set to substantially infinity, and the resistance values that indicate the other regions are set to different finite values. If the control unit detects that the resistance values indicating the other regions has become substantially infinity due to disconnection, the control unit determines that the solenoid valves are in the central region, and sets the magnitude of the control current based on this determination.

With this configuration, if, hypothetically, the selected solenoid valves were in the other regions and not the central region, even if the power supply line to the mark unit indicated by the resistance were disconnected, the solenoid valves would be mistakenly identified as being in the central region. However, as compared to if solenoid valves in a first region to one side of the central region were mistakenly identified as being in a second region to the other side of the central region, the error of the set control current from the appropriate value is smaller. Accordingly, the fall in adjustment accuracy can be reduced to the minimum.

As an example of solenoid valves like those described above, a sixth aspect of the invention describes a vehicle brake fluid pressure control device including a plurality of pressure increase valves. The device includes a master cylinder that generates brake fluid pressure based on a driver's operation of a brake operating member; and a plurality of wheel cylinders that generate braking force using brake fluid pressure generated by the master cylinder. The plurality of pressure increase control valves are provided in main conduits that connect the master cylinder with the wheel cylinders.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
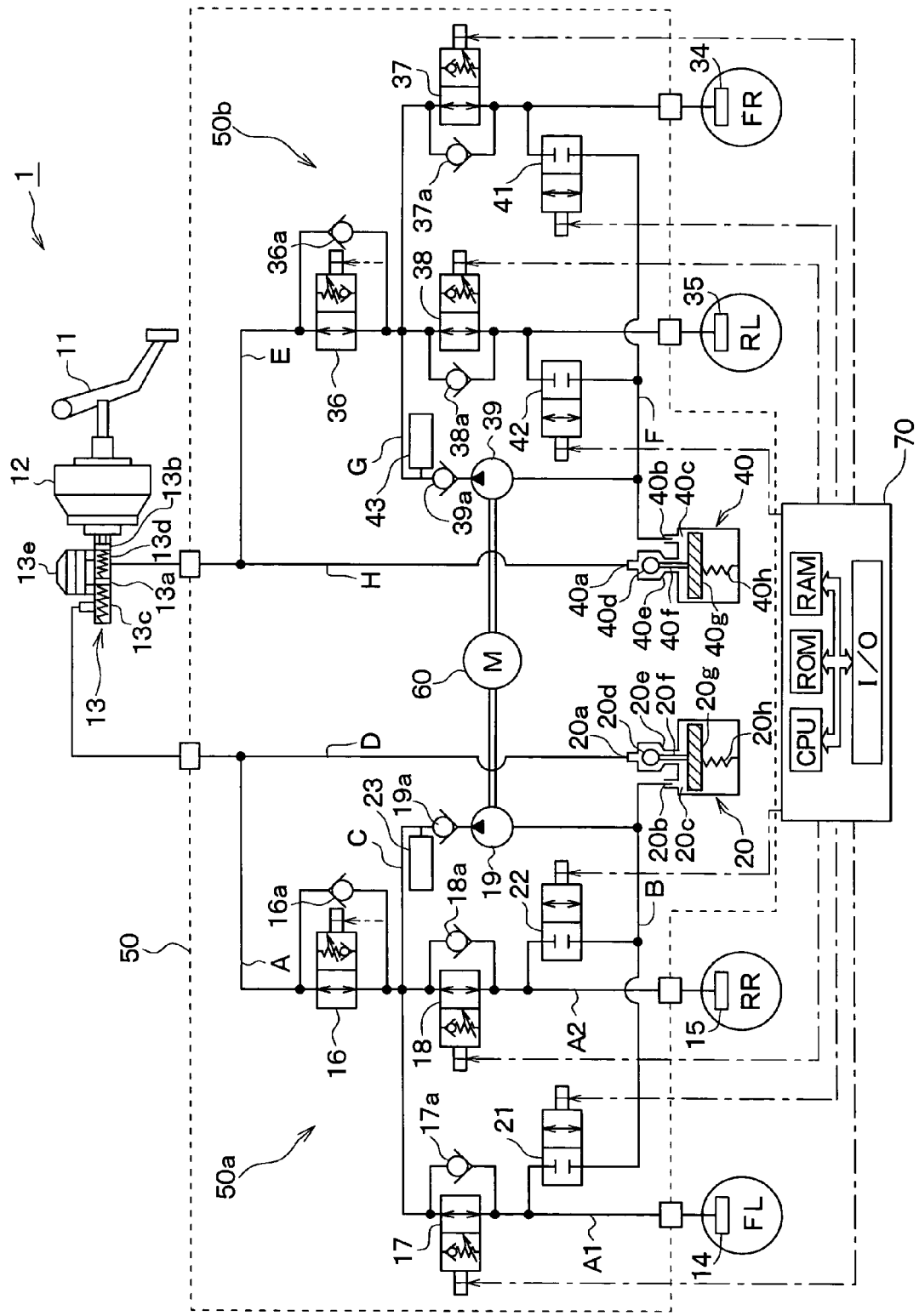
FIG. 1 shows the overall structure of a vehicle brake fluid pressure control device of a first embodiment of the present invention.

The present invention will be described further with reference to various embodiments in the drawings. Hereinafter, embodiments of the present invention will be explained with reference to the drawings.

First Embodiment

A first embodiment of the present invention will now be described. FIG. 1 shows the overall structure of a vehicle brake fluid pressure control device 1 to which the first embodiment of the present invention is applied.

Referring to FIG. 1, the vehicle brake fluid pressure control device 1 is provided with a brake pedal 11, a booster 12, a master cylinder (M/C) 13, wheel cylinders (W/C) 14, 15, 34 and 35, a brake fluid pressure control actuator 50, and a brake ECU 70.

The brake pedal 11 functions as a brake operating member and is depressed by the driver in order to apply braking force to the vehicle. The brake pedal 11 is connected to the booster 12 and the M/C 13, which function as a brake fluid pressure generating source. When the driver depresses the brake pedal 11, the depression force is increased by the booster 12, and pressure is applied to master pistons 13a, 13b disposed in the M/C 13. Thus, equal M/C pressure is generated in a primary chamber 13c and a secondary chamber 13d that are defined by the master pistons 13a, 13b.

The M/C 13 includes a master reservoir 13e that has connecting passages that are respectively connected to the primary chamber 13c and the secondary chamber 13d. The master reservoir 13e supplies brake fluid to the M/C 13 and receives excess brake fluid discharged from the M/C 13 via the connecting passages. Each connecting passage has a diameter that is substantially smaller than the diameter of main conduits that extend from the primary chamber 13c and the secondary chamber 13d. Thus, the connecting passages create an orifice effect when brake fluid flows from the primary chamber 13c and the secondary chamber 13d of the M/C 13 to the master reservoir 13e.

The M/C pressure generated in the M/C 13 is transmitted to the W/Cs 14, 15, 34 and 35 via the brake fluid pressure control actuator 50.

The brake fluid pressure control actuator 50 includes a first conduit system 50a and a second conduit system 50b. The first conduit system 50a controls the brake fluid pressure applied to a front left wheel FL and a rear right wheel RR, and the second conduit system 50b controls the brake fluid pressure applied to a front right wheel FR and a rear left wheel RL. Accordingly, the first and second conduit systems 50a, 50b form a diagonally-split brake system.

Next, the first and the second conduit systems 50a and 50b will be explained. However, since the configurations of the first and second conduit systems 50a and 50b are substantially the same, the description will focus on just the first conduit system 50a, and a description of the second conduit system 50b will be omitted.

The first conduit system 50a includes a conduit A that forms a main conduit for transmitting the M/C pressure to the W/C 14 in the front left wheel FL and the W/C 15 in the rear right wheel RR. Accordingly, the conduit A is used to generate W/C pressure in both of the W/Cs 14 and 15.

A first pressure differential control valve 16 is provided in conduit A. The first pressure differential control valve 16 is a two-position solenoid valve that can be controlled to an open position or a pressure differential position. The first pressure differential control valve 16 is controlled to be open during normal braking. However, when electric current is applied to the solenoid coil, the first pressure differential control valve 16 switches to the pressure differential position. When the first pressure differential control valve 16 is in the pressure differential position, the brake fluid on the W/Cs 14 and 15 side is only allowed to flow to the M/C 13 side when the brake fluid pressure of the W/Cs 14 and 15 side exceeds the M/C pressure by a pressure differential. Accordingly, normally, the brake fluid pressure on the W/Cs 14, 15 side is held at a level that is less than the brake fluid pressure on the M/C 13 side by the determined amount or more, whereby the respective conduits are protected.

The conduit A branches into two conduits A1 and A2 at a point downstream toward the W/Cs 14, 15 from the first pressure differential control valve 16. A first pressure increase control valve 17 is provided in one of the conduits A1, A2 (in this example, conduit A1) to control pressure increase of the brake fluid pressure to the W/C 14. Further, a second pressure increase control valve 18 is provided in the other conduit A1, A2 (in this example, conduit A2) to control pressure increase of the brake fluid pressure to the W/C 15.

The first and second pressure increase control valves 17, 18 are two-position solenoid valves that can be controlled to an open position or a closed position. When the first and second pressure increase control valves 17, 18 are controlled to be open, (i) the M/C pressure or (ii) a brake fluid pressure of brake fluid discharged from a pump 19, described later, is applied to the W/Cs 14 and 15.

The first and second pressure increase control valves 17 and 18 are normally open valves that are normally open when the driver performs braking using the brake pedal 11 in a normal manner, namely, when the control current applied to the solenoids in the first and second pressure increase control valves 17 and 18 is zero (non-energized). On the other hand, when the control current is applied to the solenoids in ABS control (energized), the first and second pressure increase control valves 17 and 18 are controlled to close. However, the magnitude of the control current (the amount of current) during energization can be adjusted so that the pressure increase control valves 17 and 18 function as linear valves that generate a determined pressure differential between the upstream and downstream sides.

The first pressure differential control valve 16 and the first and second pressure increase control valves 17 and 18 include respective safety valves 16a, 17a and 18a that are positioned in parallel to each valve 16, 17 and 18. The safety valve 16a of the first pressure differential control valve 16 is provided to allow the M/C pressure to the W/Cs 14 and 15 if the brake pedal 11 is depressed by the driver when the first pressure differential control valve 16 is in the pressure differential position. The safety valves 17a, 18a of the pressure increase control valves 17, 18 are provided to allow the W/C pressure of the front left wheel FL and the rear right wheel RR to be reduced in correspondence with the extent to which the brake pedal 11 is released if the driver eases depression or releases the brake pedal 11 when, particularly during ABS control, the pressure increase control valves 17, 18 are controlled to be closed.

A conduit B that acts as a pressure reduction passage is provided to connect between a pressure regulating reservoir 20 and respective points in conduits A1 and A2 between the first and second pressure increase control valves 17, 18 and the W/Cs 14 and 15. A first pressure reduction control valve 21 and a second pressure reduction valve 22 are positioned in the conduit B in respective sections that connect to the conduits A1 and A2. The first and second pressure reduction valves 21, 22 are two-position solenoid valves that can be controlled to open and closed positions. The first and second pressure reduction valves 21, 22 are normally closed during normal braking.

A conduit C that acts as a recirculation conduit connects between the pressure regulating reservoir 20 and the conduit A, which is the main conduit. The pump 19, which is a self-sucking pump, is provided in the conduit C. The pump 19 is driven by a motor 60 so as to suck brake fluid from the pressure regulating reservoir 20 and discharge to the M/C 13 or the W/C 14, 15 side.

A safety valve 19a is provided at the discharge port side of the pump 19 to prevent high pressure brake fluid from being applied to the pump 19. Moreover, a fixed capacity damper 23 is provided in conduit C at the discharge side of the pump 19 in order to reduce pulsation of the brake fluid discharged from the pump 19.

In addition, a conduit D that acts as an auxiliary conduit connects between the pressure regulating reservoir 20 and the M/C 3. When brake fluid pressure controls like traction control or electronic stability control (ESC), e.g., side slip prevention control, are performed, conduit D is utilized to suck up brake fluid from the M/C 13 and to discharge the brake fluid to conduit A using the pump 19. Accordingly, brake fluid can be supplied to the W/C 14, 15 side, thus allowing the W/C pressure of the controlled wheel to be increased.

The pressure regulating reservoir 20 includes a reservoir port 20a and a reservoir port 20b. The reservoir port 20a is connected to conduit D and receives brake fluid from the M/C 13 side. The reservoir port 20b is connected to conduit B and conduit C and receives brake fluid that escapes from the W/Cs 14, 15, and supplies brake fluid to the suction side of the pump 19. The reservoir ports 20a, 20b are connected with a reservoir chamber 20c. A ball valve 20d is provided at the reservoir chamber 20c side of the reservoir hole 20a. The ball valve 20d includes a rod 20f as a separate unit a rod 20f that has a determined stroke and that moves the ball valve 20d up and down.

A piston 20g and a spring 20h are provided in the reservoir chamber 20c. The piston 20g moves along with the rod 20f, and the spring 20h generates force that pushes the piston 20g toward the ball valve 20d thus pushing brake fluid out from the reservoir chamber 20c.

When a given amount of brake fluid is stored in the pressure regulating reservoir 20 with the above structure, the ball valve 20d is seated on a valve seat 20e thus stopping brake fluid from entering the pressure regulating reservoir 20. Accordingly, an amount of brake fluid that exceeds the suction capability of the pump 19 cannot flow into the reservoir 20c, which stops high pressure being applied to the intake side of the pump 19.

As described above, the configuration of the second conduit system 50b is substantially the same as that of the first conduit system 50a. More specifically, the first pressure differential control valve 16 and the check valve 16a corresponds to a second pressure differential control valve 36 and a check valve 36a; and the first and second pressure increase control valves 17, 18 and the check valves 17a, 18a correspond to third and fourth pressure differential control valves 37, 38 and the check valves 37a, 38a. Further, the first and second pressure reduction control valves 21, 22 correspond to third and fourth pressure reduction control valves 41, 42; the pressure regulating reservoir 20 and elements 20a to 20h thereof corresponds to a pressure regulating reservoir 40 elements 40a to 40h thereof; the pump 19 and the check valve 19a corresponds to a pump 39 and a check valve 39a; and the damper 23 corresponds to a damper 43. Further, conduit A, conduit B, conduit C and conduit D respectively correspond to conduit E, conduit F, conduit G and conduit H. This completes the explanation of the structure of the fluid pressure conduits of the vehicle brake fluid pressure control device 1.

The brake ECU 70 corresponds to an electronic control device, and is configured from a known microcomputer that includes a CPU, a ROM, a RAM, and an I/O port. The brake ECU 70 performs processing such as various types of calculation in accordance with programs stored in the ROM etc.

The brake ECU 70 outputs an electric signal that is used to control the voltage applied to the control valves 16 to 18, 21, 22, 36 to 38, 41 and 42 and the motor 60 for driving the pumps 19 and 39 in the brake fluid pressure control actuator 50 configured as described above. As a result, the W/C pressure generated in the W/Cs 14, 15, 34 and 35 is controlled.

The brake fluid pressure control actuator 50 controls the braking force applied to each wheel FL, FR, RL, RR in, for example, the following manner. When the brake ECU 70 outputs the electric signal to apply the control voltage to the motor 60 and the solenoids that drives the control valves, the path along which brake fluid flows in the brake conduits in the brake fluid pressure control actuator 50 is set in accordance with the applied voltage. Then, brake fluid pressure is generated in the W/Cs 14, 15, 34 and 35 in accordance with the set path in the brake conduits.

Note that the vehicle brake fluid pressure control device 1 is provided with wheel speed sensors, not shown, in each wheel FL, FR, RL and RR. Detection signals from these wheel speed sensors are input to the brake ECU 70 and used as a basis for determining the wheel speed of each wheel and a vehicle body speed. When a slip ratio that indicates the difference of the vehicle body speed and the wheel speeds becomes equal to or more than a determined value, brake fluid pressure control of ABS control or the like is performed.

Figure 4:
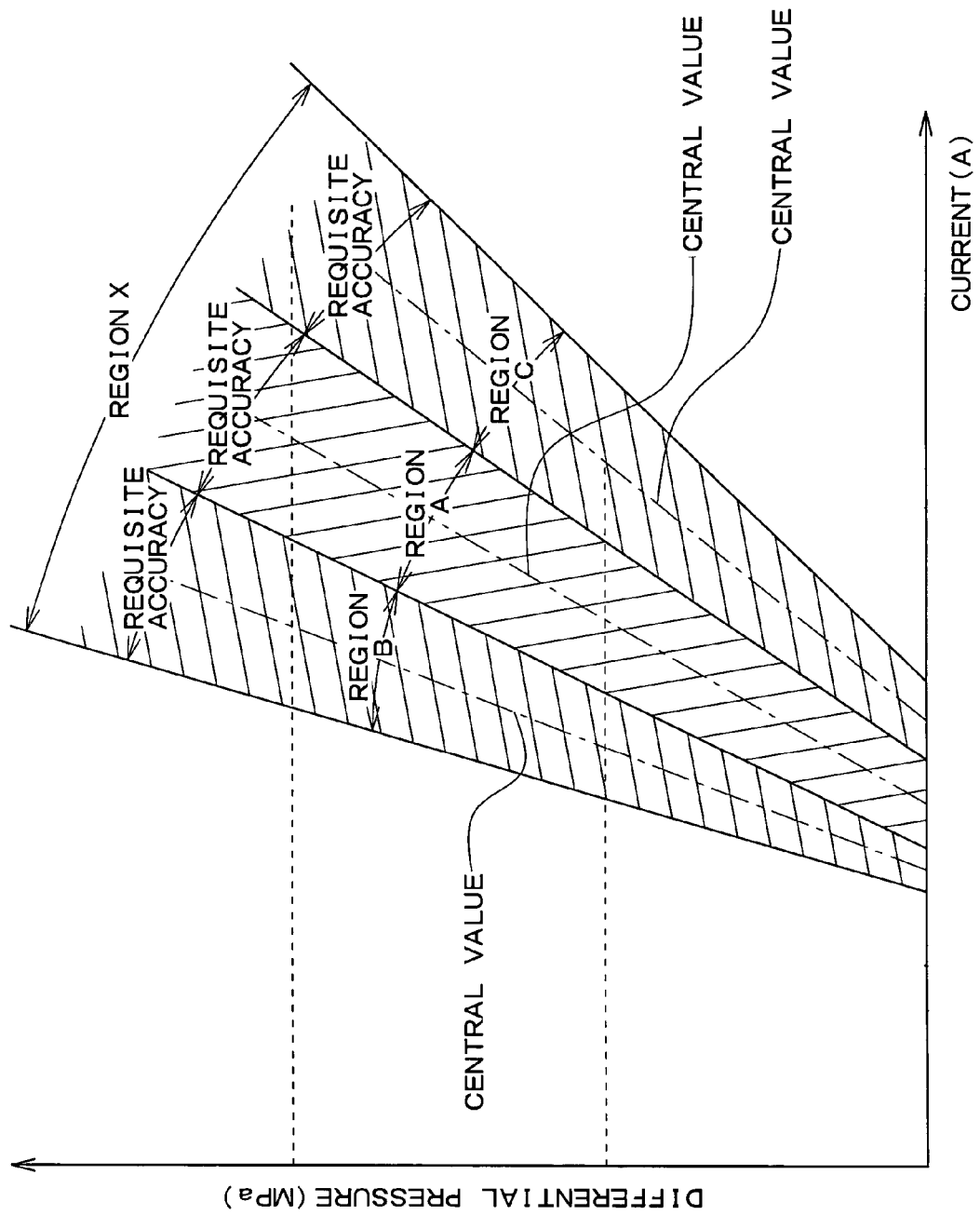
FIG. 4 is a chart showing a region X of the distribution of variations in the characteristics of the pressure increase control valves, and a plurality of regions A-C that divide region X into areas that satisfy accuracy requirements.

This completes the explanation of the vehicle brake fluid pressure control device 1 according to the present embodiment. The first to fourth pressure increase control valves 17, 18, 37 and 38 are mounted on one board 80 (refer to FIG. 2, described below) in this vehicle brake fluid pressure control device 1. Wiring is provided on the board 80 to electrically connect the first to fourth pressure increase control valves 17, 18, 37 and 38 to the brake ECU 70. In the present embodiment, the first to fourth pressure increase control valves 17, 18, 37 and 38 are solenoid valves that are all in one of regions A to C shown in FIG. 4.

Figure 2:
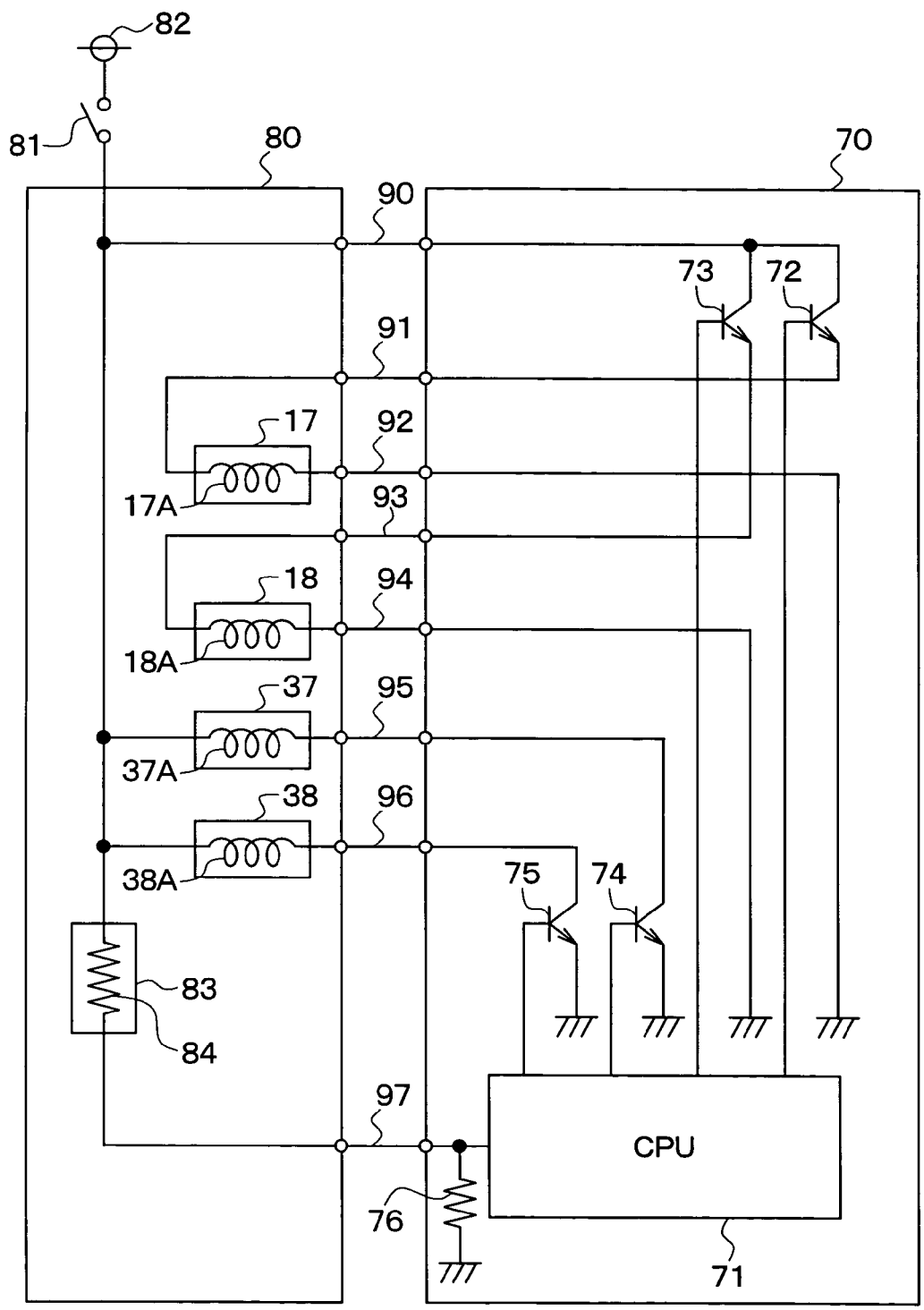
FIG. 2 shows a board on which first to fourth pressure increase control valves are mounted, electrical connections to a brake ECU, and a drive circuit for the first to fourth pressure increase control valves that is provided in the brake ECU.

FIG. 2 shows the board 80 on which the first to fourth pressure increase control valves 17, 18, 37 and 38 are mounted, the electrical connections to the brake ECU 70, and a drive circuit for the first to fourth pressure increase control valves 17, 18, 37 and 38 that is provided in the brake ECU 70.

As shown in the figure, the first to fourth pressure increase control valves 17, 18, 37 and 38 are connected to the board 80 in order. Solenoid coils 17A, 18A, 37A and 38A provided respectively in the first to fourth pressure increase control valves 17, 18, 37 and 38 are electrically connected to the brake ECU 70 via wire harnesses 90 to 96.

More specifically, electric power can be supplied to the board 80 from a power source 82 when a switch 81 is turned on. Further, the drive circuit in the brake ECU 70 and the solenoid coils 17A, 18A, 37A, and 38A are connected such that the solenoid coils 17A, 18A, 37A and 38A are positioned between the power source 82 and ground. NPN transistors 72 to 75 are provided in the lines that supply power to the solenoid coils 17a, 18a, 37a and 38a. These NPN transistors 72 to 75 are switched on and off by a control unit (CPU) 71 provided in the brake ECU 70. The base current to these NPN transistors 72 to 75 is controlled by the CPU 71 so as to control the amperage of the control current applied to the solenoid coils 17A, 18A, 37A and 38A. The above configuration is used to adjust the pressure differential generated by the first to fourth pressure increase control valves 17, 18, 37 and 38.

The above configuration also includes a mark unit 83 that indicates the characteristics, in other words, a similarity group of the pressure differential—current characteristics of the first to fourth pressure increase control valves 17, 18, 37 and 38. This mark unit 83 can be electronically read by the CPU 71 of the brake ECU 70. In the present embodiment, the resistance of a resistor 84 is used to indicate the characteristics. The resistance of the resistor 84 is set in accordance with the characteristics of the first to the fourth pressure increase control valves 17, 18, 37 and 38. Different resistors 84 with various resistances are pre-prepared for different characteristics, for example. Separate resistors 84 with resistance equivalent to infinity (with an open circuit), a few kΩ, and tens of kΩ are prepared. Then, the resistor 84 that has a resistance that corresponds to the characteristics of the first to fourth pressure increase control valves 17, 18, 37 and 38 is mounted to the board 80. Note that when the resistance of the mark unit 83 is set to be equivalent to infinity, a resistor 84 with an extremely large resistance may be prepared. However, the resistor 84 may be entirely omitted and an open circuit used instead. In other words, rather than using a different mark unit 83 having finite resistance, the resistance of the mark unit 83 may be effectively made infinite.

The resistor 84 that configures the mark unit 83 is connected to the power source 82 using the switch 81. When the switch 81 is turned on, electric power is supplied.

On the other hand, on the brake ECU 70 side, the output of the mark unit 83 is input to the CPU 71 so that the CPU 71 can recognize the mark indicated by the mark unit 83. More specifically, the low potential side of the resistor 84 is connected to the input terminal of the CPU 71 via the wire harness 97. Further, a pull-down resistor 76 is provided between the input terminal of the CPU 71 and ground, whereby the potential between the resistor 84 and the pull-down resistor 76 is input to the CPU 71. As a result, the potential between the resistor 84 and the pull-down resistor 76, is varied in accordance with the resistance of the resistor 84. Accordingly, the CPU 71 is able to identify the characteristics of the first to fourth pressure increase control valves 17, 18, 37 and 38 indicated by the resistance of the resistor 84.

Next, the operation of the vehicle brake fluid pressure control device 1 will be explained. Note that the basic brake fluid pressure control performed by the vehicle brake fluid pressure control device 1 is the same as that known in the related art. Accordingly, sections of the operation that are the same as those in the known art will not be described. The explanation given here will focus on the situation when a pressure increase mode is set during performance of, for example, ABS control, and the first to fourth pressure increase control valves 17, 18, 37 and 38 are operated linearly.

Figure 3:
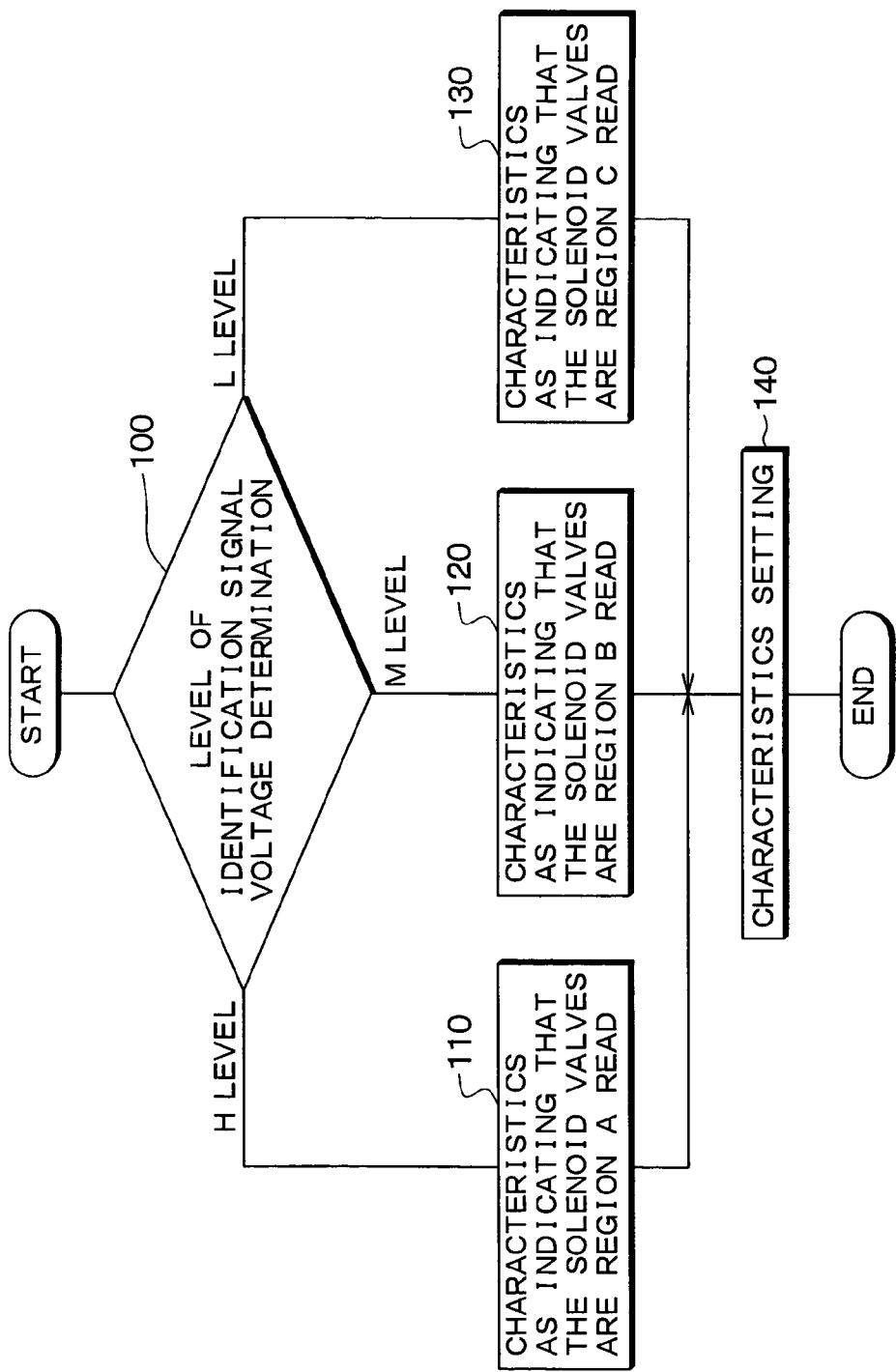
FIG. 3 is a flow chart showing a characteristics identification process.

First, the brake ECU 70 performs the characteristics identification process for the first to fourth pressure increase control valves 17, 18, 37 and 38. In other words, process for identifying similarity group of the pressure differential—current characteristics is performed. FIG. 3 shows a flow chart for the characteristics identification process.

In the processing at 100, the level of an identification signal voltage is determined. The identification signal voltage is the potential voltage input to the CPU 71, namely, the potential between the resistor 84 and the pull-down resistor 76.

Since the potential between the resistor 84 and the pull-down resistor 76 varies depending on the resistance of the resistor 84, the identification signal voltage is, for example, (i) a minimum low level L when the resistance of the resistor 84 is equivalent to infinity, (ii) a maximum high level H when the resistance is a few kΩ, and (iii) an intermediate level M between the level L and the level H when the resistance is tens of kΩ. Then, depending on the level of the identification signal voltage, the routine proceeds to the processing at 110 to 130. For example, in the case of the high level H, the ECU 70 reads the characteristics as indicating that the solenoid valves are in region A, in the case of the medium level M, as being in region B, and in the case of the low level L, as being in region C.

Next, in the processing at 140, the characteristics are set. Accordingly, when the first to fourth pressure increase control valves 17, 18, 37 and 38 are operated linearly in the brake fluid pressure control, the control current can be set in accordance with the set characteristics.

For example, if the pressure increase mode is set during performance of ABS control, the pressure increase process is performed. In the pressure increase process, if the controlled wheel is the front left wheel FL, for example, the first pressure increase control valve 17 of the front left wheel FL is linearly operated, and an electric signal is output to close the first pressure reduction control valve 21. More specifically, the CPU 71 shown in FIG. 2 causes a base current to flow to the NPN transistor 72, whereby the control current is applied to the solenoid coil 17A of the first pressure increase control valve 17. Accordingly, the first pressure increase control valve of the front left wheel FL is operated linearly.

At this time, the linear operation of the first pressure increase control valve 17 is performed such that the required pressure differential is generated between the upstream and downstream sides of the first pressure increase control valve 17, namely, between the M/C 13 and the W/C 14. To achieve this, the control current is set to an amount of current that corresponds to an estimated value for the pressure differential by adjusting the base current to the NPN transistor 72. The set control current is applied to the solenoid coil 17a of the first pressure increase control valve 17. Then, the control current to the first pressure increase control valve 17 is gradually reduced to gradually increase (in a smooth stepless manner) the pressure of the W/C 14 in the front left wheel FL.

When the pressure increase processing is performed in the above described manner, the output from the mark unit 83 mounted on the board 80, or more specifically the potential corresponding to the resistance of the resistor 84, is read by the CPU 71. Accordingly, the CPU 71 is able to identify the characteristics of the first to fourth pressure increase control valves 17, 18, 37 and 38 in advance. Thus, the CPU 71 causes a base current with an amperage that corresponds to the identified characteristics to flow to the NPN transistor 72, whereby the amperage of the control current applied to the solenoid coil 17*a* of the first pressure increase control valve 17 can be set to the central value shown in FIG. 4. As a result, the first pressure increase control valve 17 can generate a pressure differential in accordance with requirements.

As described above, according to the vehicle brake fluid pressure control device 1 of the present embodiment, the characteristics of the solenoid valves used for the first to fourth pressure increase control valves 17, 18, 37 and 38 are pre-measured, and the solenoid valves are selected based on the measurement results. Accordingly, the first to fourth pressure increase control valves 17, 18, 37 and 38 are configured using only solenoid valves in the same region. In addition, the mark unit 83 that indicates the characteristics of the first to fourth pressure increase control valves 17, 18, 37 and 38 is provided on the board 80 on which the first to fourth pressure increase control valves 17, 18, 37 and 38 are mounted. The brake ECU 70 is thus able to identify the characteristics of the first to fourth pressure increase control valves 17, 18, 37 and 38 based on the output of this mark unit 83.

Accordingly, the brake ECU 70 identifies the characteristics of the first to fourth pressure increase control valves 17, 18, 37 and 38, and sets the control current in accordance with the identified characteristics. This enables the pressure differential generated by the first to fourth pressure increase control valves 17, 18, 37 and 38 to satisfy the required accuracy. Thus, the adjustment accuracy of the brake fluid pressure control can be inhibited from falling without having to provide a characteristics measurement device to individually measure the characteristics of the first to fourth pressure increase control valves 17, 18, 37 and 38 in the brake ECU 70.

Further, as a result of only using solenoid valves in the same region for the first to fourth control valves 17, 18, 37 and 38 as in this embodiment, it is only necessary to provide one mark unit 83 to indicate the characteristics of the first to fourth pressure increase control valves 17, 18, 37 and 38. Thus, the structure required for identifying the characteristics of the first to fourth pressure increase control valves 17, 18, 37 and 38 can be simplified.

Note that, the features of the present embodiment are effective when separate units are used for the brake ECU 70 and the brake fluid pressure control actuator 50, and for example, are attached by separate makers. If the brake ECU 70 and the brake fluid pressure control actuator 50 are integrated, the characteristics of the first to fourth pressure increase control valves 17, 18, 37 and 38 may be recorded in the brake ECU 70 in advance. However, if the brake ECU 70 and the actuator 50 are separate, it is necessary to perform processing like part number management so that the brake ECU 70 and the first to fourth pressure increase control valves 17, 18, 37 and 38 correspond with each other. As compared to this, in the present embodiment, the characteristics of the first to fourth pressure increase control valves 17, 18, 37 and 38 provided on the brake fluid pressure control actuator 50 are indicated by the mark unit 83 provided on the board 80. Thus, there is no need to pay specific attention to the combination of the board 80 and the brake ECU 70, since the brake fluid ECU 70 can identify the characteristics of the first to fourth pressure increase control valves 17, 18, 37 and 38.

Further, there are cases when the brake ECU 70 and the brake fluid pressure control actuator 50 are first integrated and then distributed for use. In such cases, the present embodiment is similarly effective if one of the brake ECU 70 and the brake fluid actuator pressure control actuator 50 breaks and needs to be replaced.

Other Embodiments

In the example of the above described embodiment, the first to fourth pressure increase control valves 17, 18, 37 and 38 mounted to the board 80 are all configured from solenoid valves in the same one of regions A to C. However, it is not essential to use solenoid valves with characteristics in the same region. More specifically, the characteristics of the first to fourth pressure increase control valves 17, 18, 37 and 38 may be individually identified using the separate mark units 83 that are provided for each of the first to fourth pressure increase control valves 17, 18, 37 and 38. However, if this configuration is used, the number of power supply lines must be increased in accordance with the number of mark units 83. Accordingly, the configuration described in the first embodiment is preferable.

Moreover, the above embodiment describes an example in which the resistance of the resistor 84 is utilized for the mark unit 83 to indicate the characteristics of the solenoid valves. However, this is just one example, and the mark unit 83 may be, for example, a memory, in which the characteristics of the solenoid valves are stored in advance. The stored information in the memory may then be read to allow the characteristics of the first to the fourth pressure increase control valves 17, 18, 37 and 38 to be identified.

The above embodiment describes an example in which, as shown in FIG. 2, the pull-down resistor 76 is provided in the brake ECU 70. However, the pull-down resistor 76 may be provided on the board 80 instead of in the brake ECU 70.

Further, to provide a fail-safe in the above embodiment, if the characteristics of the solenoid valves are indicated by the resistance of the resistor 84, and if selected solenoid valves have characteristics that lie in region A that is the central region among the three divided up regions A to C, it is preferable that the resistance of the resistor 84 is set to be equivalent to infinity. If this configuration is used, if, hypothetically, the selected solenoid valves were actually in the other regions B or C, even if the power supply line to the resistor 84 were broken, the solenoid valves would be mistakenly identified as being in region A. However, as compared to if solenoid valves in region B were mistakenly identified as being in region C, the error of the set control current from the appropriate value is smaller. Accordingly, the fall in adjustment accuracy can be reduced to the minimum.

Moreover, in the case of solenoid valves in region A that are likely to occupy the largest ratio of production costs, the resistor that indicates the characteristics can be omitted in order to reduce costs.

In the description of the above embodiment the region X is assumed to be divided into the three regions A to C. However, further divisions may be provided. However, in this case, it is necessary to set the width of the regions such that they satisfy required accuracy.

While the above description is of the preferred embodiments of the present invention, it should be appreciated that the invention may be modified, altered, or varied without deviating from the scope and fair meaning of the following claims.

What is claimed is:

1. A vehicle brake fluid pressure control device, comprising:

a solenoid valve for generating a pressure differential between upstream and downstream sides thereof in accordance with the magnitude of a control current;

a control unit for controlling the magnitude of the control current applied to the solenoid valve to generate a target pressure differential between the upstream and downstream sides of the solenoid valve; and a mark unit for indicating a similarity group to which the solenoid belongs, among a plurality of predetermined similarity groups, wherein the predetermined similarity groups are grouped according to similarity of pressure differential and current characteristics, the control unit stores a map in which the entire range of variation in pressure differential and current characteristics of the solenoid valve is divided into a plurality of regions according to similarity, and the predetermined similarity groups respectively correspond to the regions, and the mark unit signals to the control unit the similarity group to which the solenoid valve belongs, and when the control unit has identified which one of the plurality of regions the solenoid valve is within, according to the similarity group signaled by the mark unit, the control unit sets the magnitude of the control current to a value that accords with the identified region when brake fluid pressure control is performed.

2. The vehicle brake fluid pressure control device according to claim 1, wherein the solenoid valve is one of a plurality of solenoid valves that are, mounted on a single board and are electrically connected to wiring provided on the board, the plurality of solenoid valves includes only solenoid valves that are in one of the predetermined similarity groups, and the mark unit indicates the similarity group to which the solenoid valves belong.

3. The vehicle brake fluid pressure control device according to claim 1, wherein the mark unit uses a resistance value to indicate the similarity group, and the resistance value of the mark unit is set to be different for each of the plurality of predetermined similarity groups.

4. The vehicle brake fluid pressure control device according to claim 3, wherein the control unit identifies the similarity group of the solenoid valve by reading the electric potential of a determined portion that changes in accordance with the resistance value of the mark unit.

5. The vehicle brake fluid pressure control device according to claim 3, wherein the resistance value that indicates a central region that is at the center of the plurality of regions is set to substantially infinity, and the resistance values that indicate the other regions are set to different finite values, and if the control unit detects that the resistance values indicating the other regions has become substantially infinity due to disconnection, the control unit determines that the solenoid valves are in the central region, and sets the magnitude of the control current based on this determination.

6. The vehicle brake fluid pressure control device according to claim 1, further comprising:

a master cylinder for generating brake fluid pressure based on an operation of a brake operating member performed by a driver;

a plurality of wheel cylinders for generating braking force using brake fluid pressure generated by the master cylinder;

main conduits for connecting the master cylinder and the wheel cylinders; and a plurality of pressure increase control valves, provided in the main conduits at positions corresponding to each of the wheel cylinders, for controlling brake fluid pressure applied to the wheel cylinders, wherein the control unit supplies the control current to respective solenoid coils provided in the pressure increase control valves in order to drive the pressure increase control valves, and the mark unit indicates to the control unit the similarity group to which the pressure increase control valves belong.

7. A vehicle brake fluid pressure control device, comprising:

a plurality of solenoid valves, wherein each solenoid valve generates a pressure differential between upstream and downstream sides thereof in accordance with the magnitude of a control current, the plurality of solenoid valves are selected to belong to a single similarity group, among a plurality of predetermined similarity groups, according to pressure differential and current characteristics, the predetermined similarity groups are grouped according to degree of similarity of pressure differential and current characteristics;

a control unit for controlling the magnitude of control currents applied to the solenoid valves to generate a target pressure differential between the upstream and downstream sides of the solenoid valves; and a mark unit for indicating the single similarity group to which the solenoid valves belong, wherein the control unit stores a map in which a range of variation in pressure differential and current characteristics of the solenoid valves is divided into a plurality of regions according to similarity, and the predetermined similarity groups respectively correspond to the regions, and the mark unit signals to the control unit the single similarity group to which the solenoid valves belong, and when the control unit has identified the similarity group to which the solenoid valves belong, according to the mark unit, the control unit sets the magnitude of the control currents according to the differential and current characteristics of the region of the map that corresponds to the identified similarity group, when a brake fluid pressure control operation is performed.

8. A vehicle brake fluid pressure control device according to claim 7, wherein a resistance value of the mark unit indicates the similarity group to which the solenoid valves belong.

9. A vehicle brake fluid pressure control device according to claim 7, wherein the control unit identifies the similarity group of the solenoid valves by reading an electric potential of a predetermined circuit location that changes in accordance with the resistance value of the mark unit.

* * * * *